United States Patent [19]

Engel et al.

[11] Patent Number: 5,112,393
[45] Date of Patent: May 12, 1992

[54] METHOD OF RENDERING MASONRY MATERIALS WATER REPELLENT WITH LOW VOC ORGANOALKOXYSILANES

[75] Inventors: James F. Engel, Kansas City, Mo.; Gerald E. Boyer, Naples, Fla.

[73] Assignee: ProSoCo, Inc., Kansas City, Kans.

[21] Appl. No.: 594,653

[22] Filed: Oct. 9, 1990

[51] Int. Cl.$^5$ .................... B32B 27/36; B05D 3/02
[52] U.S. Cl. ..................... 106/2; 106/287.12; 106/287.13; 106/287.14; 106/287.16; 524/861; 428/447; 428/429
[58] Field of Search ............... 106/2, 287.12, 287.13, 106/287.14, 287.16; 524/861

[56] References Cited

U.S. PATENT DOCUMENTS

| | | |
|---|---|---|
| 2,382,082 | 8/1945 | McGregor ............... 106/287.16 |
| 2,625,520 | 1/1953 | Rust et al. ............. 106/287.16 |
| 3,589,917 | 6/1971 | Hedlund . |
| 3,772,065 | 11/1973 | Seiler . |
| 3,849,357 | 11/1974 | Wolf . |
| 3,879,206 | 4/1975 | Nestler et al. . |
| 3,914,476 | 10/1975 | Nitzsche et al. . |
| 3,955,985 | 5/1976 | Bosch et al. . |
| 3,956,570 | 5/1976 | Bosch et al. . |
| 4,002,800 | 1/1977 | Nestler et al. . |
| 4,031,282 | 6/1977 | McClinton . |
| 4,073,972 | 2/1978 | Nestler et al. . |
| 4,076,868 | 2/1978 | Roth et al. . |
| 4,102,703 | 7/1978 | Tully . |
| 4,195,010 | 3/1980 | Russell et al. . |
| 4,209,432 | 6/1980 | Roth . |
| 4,273,813 | 6/1981 | Meddaugh . |
| 4,338,375 | 7/1982 | Hashimoto et al. ........... 106/287.16 |
| 4,342,796 | 8/1982 | Brown et al. . |
| 4,352,894 | 10/1982 | Schmidt . |
| 4,377,608 | 3/1983 | Daundt et al. . |
| 4,413,102 | 11/1983 | Lanaka et al. . |
| 4,433,013 | 2/1984 | Puhringer . |
| 4,478,911 | 10/1984 | Price . |
| 4,486,476 | 12/1984 | Fritsch et al. . |
| 4,525,213 | 6/1985 | Linn . |
| 4,617,057 | 10/1986 | Plueddemann . |
| 4,631,207 | 12/1986 | Price . |
| 4,648,904 | 3/1987 | DePasquale et al. . |
| 4,716,051 | 12/1987 | Radler . |
| 4,717,599 | 1/1988 | Merrill . |
| 4,741,773 | 5/1988 | Kuroda et al. . |
| 4,753,977 | 6/1988 | Merrill . |
| 4,786,531 | 11/1988 | Hadson . |
| 4,804,572 | 2/1989 | Radrogi . |
| 4,846,886 | 7/1989 | Fey et al. . |
| 4,874,431 | 10/1989 | Fey et al. . |
| 4,877,654 | 10/1989 | Wilson . |
| 4,889,747 | 12/1989 | Wilson . |

*Primary Examiner*—William R. Dixon, Jr.
*Attorney, Agent, or Firm*—Litman, McMahon & Brown

[57] ABSTRACT

A composition and method for rendering a surface water repellent. The composition is a substantially solvent-free organoalkoxysilane having between two and nine silicon atoms per silane. An oleophobic organofluoro compound may be added to the composition in order to render the surface also oil repellent.

23 Claims, No Drawings

METHOD OF RENDERING MASONRY MATERIALS WATER REPELLENT WITH LOW VOC ORGANOALKOXYSILANES

BACKGROUND OF THE INVENTION

The present invention relates to the use of water-repellent compositions of solvent-free dimers, trimers and other lower oligomers of organoalkoxysilanes, as well as mixtures thereof on siliceous or carbonaceous surfaces. The compositions may also be rendered oil resistant by the addition of fluoroorganic compounds, especially fluoro organic polymers.

Silicon based materials have been used for many years to render masonry and related surfaces water repellent. Many improvements have been made over the years to improve the efficacy of the materials in repelling water. Improvements have also been made in the silicon based materials in the areas of durability or wear and with respect to reducing the attraction of atmospherically carried dirt and other contaminants to surfaces on which the materials have been applied.

Many of the alkyltrialkoxysilanes currently available as water repellent surface coatings are quite suited for such a purpose. Nevertheless, environmental pollution has become a more prominent issue in recent years and conventional alkyltrialkoxysilane compositions release a substantial amount of air polluting solvents and organic by-products upon application to a surface and during a subsequent curing process thereof. Therefore, it is desirable to provide a silicon based water repellent for treating surfaces that substantially renders the surfaces as resistant to liquid water as prior art silicon based compounds, while releasing substantially less pollution in the form of volatile organic compounds (VOC) during curing of the repellent.

In particular, prior art organosilicon compositions used as water repellents typically include silicone oils or fluids, alkali metal siliconates, polysiloxanes, and alkyltrialkoxysilane monomers or mixtures thereof. Such compositions have been dissolved in organic solvents, emulsified with water, catalyzed by a variety of catalysts, applied under a variety of conditions, admixed with surfactants, fillers, etc. The substrates to which these water repellents have been applied have included inorganic or organic materials that contain many different types of hydroxyl-group-bearing components having hydroxyl sites at which silicon-oxygen bonds can be formed or other sites to which the silicon can bond. Such substrates generally have included masonry products, cellulosic materials and similar materials.

Solutions of silicone oils were among the first organosilicon materials employed as water repellents, but upon evaporation of the solvent, the silicone oils often left surfaces sticky, because the oils did not polymerize into pores within the substrate, and, thus, facilitated accumulation of atmospheric dirt. Alkali metal siliconates improved performance in this area, but the siliconates pose some safety hazards to applicators because of their intrinsic high alkalinity, and on some substrates, a surface film remained after application of the siliconates.

Solutions of polysiloxanes and/or alkyltrialkoxysilane monomers in organic solvents have proven to be very good water repellents and have been highly successful in preventing corrosive chloride ions from salt or the like from entering masonry and damaging metal, such as reinforcing bar, therein. Many such compositions of polysiloxanes and/or alkyltrialkoxysilanes monomers are considered highly effective for their intended purpose when the performance of such compositions as water repellents alone is considered.

However, prior art compositions of polysiloxanes and alkyltrialkoxysilanes, as well as the silicone oils, contribute to air pollution by virtue of the solvents therein which evaporate into the atmosphere. In addition, polysiloxanes and alkyltrialkoxysilane monomers also release alcohols during their curing process as noted by the following equations:

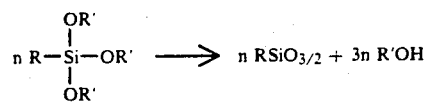

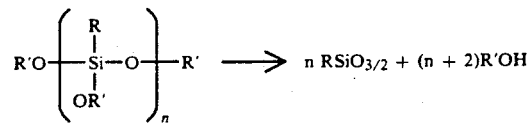

(wherein R and R' are organic radicals and n is an integer) It is noted that the alkyltrialkoxysilane monomers release a greater amount of volatile organic compounds (VOC) to the atmosphere per unit weight upon application to a surface and prior to curing as compared to the polysiloxanes, because the monomers are inherently more volatile due to the relatively low molecular weights thereof and the monomers release more volatile alcohols per unit weight as compared to the polysiloxanes.

Water emulsions of alkyltrialkoxysilane monomers and polysiloxanes have been tried as water repellents, but generally have shown poor performance characteristics due to fundamental chemical instability, lack of pH stability, presence of color formation especially upon irradiation with ultraviolet light, lack of penetration depth, and/or poor water-repellency.

Recently, solvent-free alkyltrialkoxysilane monomers have found limited utility as water repellents. These solvent-free materials have been shown to penetrate more deeply into substrates than solvent-carried alkyltrialkoxysilane monomers or polysiloxanes. However, the VOC levels for these materials are not appreciably lower than some prior art repellents, as the monomers themselves are volatile enough to significantly evaporate from warm/hot substrates and a substantial amount of volatile alcohol is released upon polymerization during curing.

Thus, there is a need for high performance water repellents that do not change the appearance of substrates, that are stable over a wide range of the pH scale, that are relatively long wearing, that are effective chloride ion screens, and especially that release relatively low levels of VOC to the environment. Moreover, it is desirable for such water repellents to also be oleophobic so that the repellent may simultaneously be resistant to both oil and water, thereby producing a generally graffiti resistant surface.

SUMMARY OF THE INVENTION

The present invention is directed to improved water-repellent compositions for masonry products, cellulosic materials, and other substrates capable of forming silicon-oxygen bonds with the water repellent compositions.

The repellents of the present invention are generally neat or solvent-free compositions of an organoalkoxysilane wherein the silane has from two to approximately nine silicon atoms with from two to six silicon atoms functioning best for most applications, and preferably has from two (dimer) to three (trimer) silicon atoms. Although the composition may consist of a single uniform organoalkoxysilane, mixtures of different silanes may be and normally are present. The presence of different silanes is even more likely as soon as the composition is exposed to atmospheric air, as moisture in the air will react with some of the silanes to promote polymerization. While the organo group may be any of a wide range of organic radicals having up to thirty carbons wherein many different atoms may be substituted for hydrogen and/or multiple bonds may exist between carbons, relatively less expensive and simple alkyls are found to function well and alkyl groups having between four and eight carbons or mixtures thereof are preferred. Likewise, while the alkoxy groups may be exotic organic compounds with hydrogen substituted by varied other atoms and/or double bonding between carbons, relatively low alkyl chains (eight or fewer) function well with methoxy and ethoxy groups being preferred or mixtures thereof. A preferred composition of the invention is a solvent-free flowable liquid in which the silane is 1,3-di-n-octyl-1,1,3,3-tetraethoxydisiloxane or 1,3-di-n-octyl-1,1,3,3-tetramethoxydisiloxane or other dimer and trimer silanes having alkyl groups with between four and eight carbons and alkoxy groups with one or two carbons and mixtures thereof prior to polymerization.

The repellent compositions of the present invention are also preferably oleophobic. The repellents are rendered oleophobic by the inclusion of a fluoroorganic compound that is oil repellent. Preferably, the fluoroorganic compound is incorporated within the repellent in amounts of from about 0.1 to 2.0 percent by weight although greater amounts may be included.

Preferably, the repellent compositions of the present invention have no solvent for either the organoalkoxysilane component or the fluoroorganic component. In a preferred embodiment, the organoalkoxysilane is a dimer, timer, or mixture thereof, silane in an amount from approximately 100.0 to 98.0 present by weight and a polyfluorinated organic polymer in an amount from 0.0 to 2.0 present by weight.

The repellent compositions of the invention are applied in a solvent-free state to siliceous and carbonaceous surfaces or the like having hydroxyl groups to which silicon may bond. The repellents of the present invention after being applied to and curing on a surface of a substrate provide highly effective performance as water repellents compared to prior technologies, do not impart detectable aesthetic change in appearance to the substrate, are chemically stable on substrates characterized by pH values over a wide range of the pH scale, are stable to ultraviolet and visible light, and release extremely low levels of volatile organic compounds (VOC) to the environment. Moreover, addition of solvent-free oleophobic organofluoro compounds to the repellents results in surface treatments that are oil repellent as well as water repellent, with the organofluoro compound penetrated into the substrate to relatively deep levels, thus yielding generally graffiti resistant substrates and associated surfaces.

OBJECTS OF THE INVENTION

Therefore, the objects of the present invention are: to provide silane compositions that will penetrate substrates as deeply as, or nearly as deeply as, solvent-free alkyltrialkoxysilane monomers and more deeply than solvent-carried alkyltrialkoxysilane monomers, but have significantly lower vapor pressures and higher boiling points which result in significantly reduced evaporation compared to the monomers; to provide such compositions that will penetrate substrates significantly deeper than solvent-carried polysiloxanes and thus be less prone to removal by abrasion; to provide such compositions that will have effective chloride ion screening properties that are comparable to polysiloxanes and alkyltrialkoxysilane monomers; to provide such compositions that will not only excel in performance as water repellents, but will simultaneously perform as oil repellents; to provide such compositions that are relatively easily spread on a surface to be treated thereby and which coat a relatively large area of such a surface for each unit by weight of composition used; to provide such compositions which release relatively low levels of VOC compared to prior art water and oil repellents; to provide a method of manufacturing a neat composition of organoalkoxysilanes and organofluoro compounds; and to provide such compositions that are relatively easy to use, inexpensive to produce and are especially well suited for the intended purpose thereof.

Other objects and advantages of this invention will become apparent from the following description wherein are set forth, by way of illustration and example, certain embodiments of this invention.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, compositions disclosed herein are not to be interpreted as limiting, but merely as a basis for the claims and as a representative basis for teaching one skilled in the art to variously employ the present invention.

The present invention is especially directed to solvent-free mixtures of organoalkoxysilane oligomers having between two and nine silicon atoms per silane and preferably to a neat or solvent-free liquid composition of silane dimers, trimers and other relatively low oligomers, as well as mixtures thereof. As used herein low oligomers of silanes means a silane having between 2 and 9 silicon atoms and the term neat means an essentially solvent-free composition. The oligomer silane structures are:

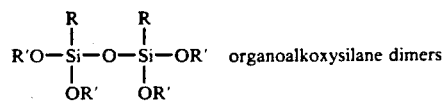

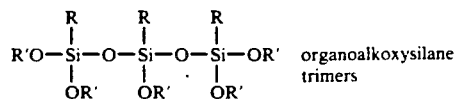

-continued

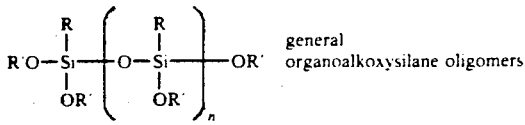
general organoalkoxysilane oligomers (wherein n=1 to 8 and R and R' are organic radicals) The above oligomer silane structures are compared to alkyltrialkoxysilane monomers and polysiloxanes that have the following general formulas:

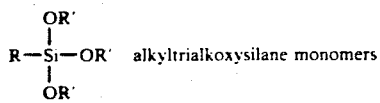
alkyltrialkoxysilane monomers

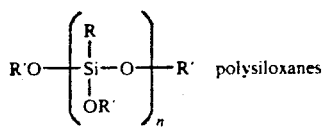
polysiloxanes (where n=10 to about 80 and where R and R' are organic radicals)

In accordance with the present invention, an organoalkoxysilane neat or essentially solvent-free flowable liquid composition is provided for the treatment of surfaces of substrates, especially where the surfaces and pores from the surfaces into the substrates have exposed hydroxyl groups to which silicon in the silane may bond. Such substrates include, but are not limited to, masonry surfaces (such as concrete, plaster, calcareous sandstone and brick), carbonaceous surfaces (such as cellulose especially, wooden decks) and the like. The composition may also be utilized in conjunction with aluminum-containing masonry. The organoalkoxysilane of the present invention has the following general formula:

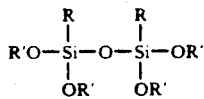

In the above formula, R is an organic group or radical, especially an alkyl, cycloalkyl, arylalkyl or alkaryl group of from one to about thirty carbons in length. Each of the carbons in the R groups may have associated hydrogens or heteroatoms such as oxygen, nitrogen, sulfur and fluorine or may have double or ring (aryl) bonds with adjacent carbons. The R groups on each silane molecule and on different silane molecules within the composition may be all the same or may be various mixtures thereof. R groups of from four to eight carbons have been found to be effective. R groups wherein R is isobutyl, n-hexyl or n-octyl are preferred. It is noted that it is also possible for R's to polymerize to combine silanes.

Further in the above formula, R' is an organic group or radical, especially an alkyl or alkoxyalkyl group containing from one to about eight carbon atoms. While it is foreseen that the R' groups may be quite exotic organic radicals with various atoms besides hydrogen and/or with multiple or cylic bonds between carbons, relatively simple and inexpensive alkyl groups function well within the scope of the invention.

Preferably, the R' groups are methyl or ethyl or mixtures thereof. The methyl groups are preferred where it is desirable to limit the release of VOC's as compared to the weight of the silanes used; however, in some locations release of ethanol may be preferred to the release of methanol and, therefore, ethoxy groups may be preferred for the R' groups. It is foreseen that the R' groups on a single silane molecule or on different silane molecules within the composition may all be the same or may be different mixtures of various R's. Normally, R' groups with carbon chains below eight, especially one or two, are preferred. Nevertheless, the larger carbon chained R' groups tend to polymerize and cross-link slower within pores of the surface being treated which typically leads to deeper penetration of the repellent into the substrate of the surface. Consequently, for some applications, longer carbon chained R' groups will be desirable; and, in other applications, relatively short (1 or 2) carbon chain groups will be preferred.

Also in the above compound, n is between 1 and 8 such that each silane molecule (except for condensation products thereof) has between 2 and 10 silicon atoms. Preferably, n is 1 (dimer) or 2 (trimer) but silanes wherein n is 3 (tetamer) and 4 (pentamer) or another oligomer up to n being 8 are foreseen to have uses in accordance with the present invention.

Due to the low viscosity of the organoalkoxysilane oligomers composition of the present invention, the compositions have a relatively deep penetration into a substrate to which the composition is applied prior to curing. After curing, the depth of the resulting water repellent insures that the repellent will not be easily or quickly removed by abrasion or wear. Furthermore, the silanes may function as a carrier for an oleophobic organofluoro compound. Organofluoro compounds are known to impart oil repellency properties to silicon-based water repellents; however, they are also known for their lack of penetration into substrates. A solvent-carried organofluoro compound may be added to the solvent-free dimers and trimers; thereafter and prior to application to a surface, the carrier solvent for the organofluoro compound is removed by vacuum distillation. The depth of penetration of the organofluoro compound is enhanced by using the silane as a carrier thereof as compared to a conventional solvent carrier.

Consequently, in certain embodiments of the present invention, neat liquid compositions of substantially pure oligomers of organoalkoxysilanes will be utilized along with mixtures and condensation products thereof. In other embodiments an organofluoro compound may be added to the composition to render oleophobic the surfaces upon which the compositions are applied.

The organofluoro compound may be any such compound that has oleophobic properties, that is soluble in the silane and that does not have other detrimental attributes. Oleophobic organofluoro compounds suitable for this purpose are disclosed in U.S. Patents to Plueddemann U.S. Pat. No. 4,617,057 and Bodrogi U.S. Pat. No. 4,804,572 which are incorporated herein by reference. A preferred organofluoro compound is a fluoropolymer that has a molecular weight of approximately 100,000 and that is sold by 3M under the product designation FC-905. The organofluoro compound of the present invention is normally incorporated in the composition with the silane in an amount within a range from 0.1 to 2 percent by weight of the overall composition with about 1 percent being preferred. However, it is foreseen that greater quantities could be included with cost of the fluoro compound being a somewhat limiting factor.

The organofluoro compound is normally added to the silane composition before application of the mixture to a surface to be treated. Prior to addition to the silane, many of the organofluoro compounds require a solvent, such as trichloroethane, to remain in solution. Such a solvent is undesirable in the present invention. Consequently, the organofluoro compound with a highly volatile solvent therein is first added to the silane. The volatile solvent is then removed by vacuum distillation or the like under controlled conditions such that the volatile solvent is recovered without being released to the environment and then the mixture with both organofluoro compound and silane is utilized to treat a surface.

It is foreseen that other ingredients can be included in the silane composition that are soluble therein, such as biocides.

Because of polymerization upon curing, different monomer or oligomer silanes may have very similar cured end-products within and on the substrate if the organic radicals of the different silanes are the same regardless of which silane is used. Thus, an important differentiating performance characteristics of the silanes, assuming an equal weight of end-product, is the depth of penetration into the substrate. If the depth of penetration is too deep, then performance effectiveness may be impaired by diffusion; if the depth of penetration is not deep enough, then a surface scum may be present and/or the long-term effectiveness may be impaired due to loss of repellent by abrasion or erosion. The ideal silane end product will penetrate deep enough to provide an effective repellency over a reasonable life expectancy given normal wear-and-tear at an economically acceptable coverage rate, but not so deeply as to consume excessive quantities of repellent or so diffusely as to provide inadequate repellency after a modest extent of wear-and-tear.

Surfaces are treated with the compositions of the present invention by applying the composition to the surface and spreading by any suitable method such as brushing, troweling, rolling and preferably spraying. The compositions of the present invention provide relatively high rates of coverage (for example, the silanes of the invention may cover over 500 square feet per gallon as compared to typical coverage for conventional solvent carried silane monomers of about 200 square feet per gallon). The silanes of the present invention, when applied to a surface of a masonry or other substrate, coat the surface and flow into pores opening onto the surface. It is believed that the silane polymerizes both in a linear and cross-linking manner to align with the pores and, in certain instances, to bond to exposed hydroxyl groups on the surface and in the pores. The silane, after binding, allows water vapor to "breathe" through the surface, but repels liquid water.

As noted above, after curing, the structures of the linked silanes of the present invention are similar to the structures formed by monomer silanes upon curing. The difference between the present invention and the conventional monomer silanes being a substantial decrease in the quantity of VOC's released. In particular, conventional solvent carried monomer silanes, as well as previous usage of dimer or other low oligomer silanes, typically include a volatile solvent which is not included in the present invention and in the prior art compositions such volatile solvents are evaporated into the atmosphere during the curing process. Secondly, the monomer silanes (including neat monomer silanes) are more volatile than the higher silanes and, hence, more of the monomer silanes themselves tend to spontaneously evaporate, especially on hot surfaces. Thirdly, when the silanes polymerize or cure, alcohols (or other volatile hydroxyl compounds) are produced. Because of the presence of more silicon in the oligomer silanes, as compared to monomer silanes, fewer by-product volatiles are released by the oligomer silanes per quantity of weight of silane used.

It is also noted that silanes of the present invention are preferable to polysiloxanes which are defined as having between 10 and about 80 silicons, since the polysiloxanes require a solvent in order to be in a usable composition and do not penetrate into the substrate being treated as deeply as the silanes of the present invention and are, thus, more prone to wear and abrasion.

Organoalkoxysilanes are well known in the prior art, for example see U.S. Patent to Hedlund U.S. Pat. No. 3,589,917 which is incorporated herein by reference. Silane compositions including lower molecular weight oligomers are also found in the prior art, for example see U.S. Patent of Linn U.S. Pat. No. 4,525,213 wherein oligomers are included in a solvent composition. However, the silane oligomers of the present application, form effective water repellents having especially low VOC levels that are not disclosed in the prior art. Similarly, the utility of organoalkoxysilane oligomers as an otherwise solvent-free carrier for organofluoro compounds to provide treatments that are oil repellent as well as water-repellent with the fluoropolymer penetrating relatively deeply into the substrate is also not shown in the prior art.

The following examples are for the purpose of illustrating the present invention and are not intended to be limiting upon the scope of the claims of the present application.

EXAMPLE 1

Properties of silanes according to the present invention were compared to properties of prior art compositions. For testing purposes blocks were prepared that were new, sandblast-finished, salt and pepper glass fiber reinforced concrete that was cut into six generally equal sample substrates. The sample substrates were oven dried to a constant weight and allowed to reabsorb atmospheric humidity for 24 hours prior to treatment.

Silanes were prepared in accordance with the following descriptions:

Sample A: a silane composition was prepared in accordance with the present invention. Silane Sample A is a generally solvent-free composition of 1,3-di-n-octyl-1,1,3,3-tetraethoxydisiloxane. The silane composition for Sample A was manufactured by PCR, Inc. of Gainesville, Fla.

Sample B: a silane composition incorporating the same silane as Sample A except having isopropyl alcohol solvent in the amount of 20 percent by weight Sample C: an isobutyltrimethoxysilane composition having incorporated therein a fluoropolymer sold under the product designation FC-905 by 3M in the amount of 10 percent by weight. The fluoropolymer being 10 percent by weight of the FC-905 with a remainder being a tricloroethane solvent, such that Sample C has 1 percent by weight active fluoropolymer.

Sample D: same as Sample C except that FC-905 is present in an amount of 20 percent by weight making the fluoropolymer 2 percent by weight active.

Sample E: a solvent-free composition of isobutyl-trimethoxysilane.

Each of the Samples A through E were applied to a respective sample substrate in one saturating, low pressure spray application from top to bottom of a vertical surface of the substrate. The sprayed silanes were not backbrushed and run-down was minimal in each case. Water repellent capillary uptake was weighed and recorded for each applied Sample subsequent to curing as noted below.

In particular, after application of the silane of the Samples to respective substrates, the treated substrates were allowed to cure for five days prior to performance testing. To determine water absorption through the face of the substrate to which the silanes were applied, three 2-inch square cubes were cut from each of the spray applied substrates, oven dried to a constant weight and allowed to cool prior to testing. To determine water absorption through the treated face, the four cut sides and back face were coated with paraffin wax prior to testing. The testing described herein was conducted in accordance with ASTM Standard C-140-75 for Sampling and Testing Concrete Masonry Units and in accordance with Rilem Test Method No. 11.4 for Water Absorption Under Low Pressure by Pipe Method. Weight gains of the treated substrates after immersion in water was determined at 60-minutes and 24 hours and are shown in Table 1 compared to an untreated substrate. Color enhancement, water and oil surface repellency, water absorption tube test and coverage rates were determined and are shown in Table 2.

TABLE I

| Treatment | Test Sample Specimen | Moisture Abs. After 60 min. | Moisture Abs. After 24 Hours | % Effectiveness | |
|---|---|---|---|---|---|
| Untreated Substrate | 1 | 0.76% | 2.49% | ... | |
| | 2 | 0.62% | 2.29% | ... | |
| | 3 | 0.53% | 1.88% | ... | |
| | average | 0.64% | 2.22% | ... | |
| Sample A | 4 | 0.06% | 0.16% | 93% | |
| | 5 | 0.08% | 0.10% | 95% | |
| | 6 | 0.07% | 0.49% | 78% | |
| | average | 0.07% | 0.25% | 89% | *94% |
| Sample B | 7 | 0.04% | 0.08% | 96% | |
| | 8 | 0.05% | 0.11% | 95% | |
| | 9 | 0.05% | 0.10% | 95% | |
| | average | 0.05% | 0.10% | 95% | |
| Sample C | 10 | 0.04% | 0.10% | 96% | |
| | 11 | 0.05% | 0.17% | 92% | |
| | 12 | 0.05% | 0.11% | 95% | |
| | average | 0.05% | 0.13% | 94% | |
| Sample D | 13 | 0.09% | 0.37% | 83% | |
| | 14 | 0.06% | 0.14% | 94% | |
| | 15 | 0.05% | 0.12% | 95% | |
| | average | 0.07% | 0.21% | 91% | |
| Sample E | 16 | 0.07% | 0.24% | 81% | |
| | 17 | 0.07% | 0.15% | 94% | |
| | 18 | 0.29% | 1.02% | 54% | |
| | average | 0.14% | 0.46% | 79% | *91.5% |

*The average effectiveness was recalculated showing deletion of 6 and 18.

TABLE II

| Sample | Color | Surf. Water Repell. | Oil Repell. | Abs. Tube mls. | Covge Rate | Active Wet Depos. | Penetration Depth |
|---|---|---|---|---|---|---|---|
| untreated | ... | 3 | NB | 0.3 | ... | ... | ... |
| Sample A | A | 2 | NB | 0.1 | 492 | 6.93 | 1-2 |
| Sample B | A | 2 | NB | 0.1 | 556 | 4.77 | 1-2 |
| Sample C | A | 1 | B | 0.0 | 516 | 6.22 (0.07) | 1-2 |
| Sample D | A | 1 | B | 0.0 | 584 | 5.01 (0.13) | 1-2 |
| Sample E | A | 2 | NB | 0.1 | 496 | 7.02 | 1-2 |

Test results are summarized below:

The results of the water absorption by ASTM Standard C 140, Wax Immersion after 24 hours indicate that all Samples A through E evaluated produced superior results (91% -95%) effectiveness compared to the untreated specimens.

The color enhancement test by Visual assessment after 2 hours and after 96 hours indicate that at 2 and 96 hours following treated surfaces visually resembled untreated samples (The letter A indicates no change and the letter B indicates slight darkening).

Results of surface water repellency tests are indicated by numbers wherein 1 indicates excellent with no flattening, 2 indicates good with slight flattening and 3 indicates poor with surface wet. Samples C and D displayed excellent surface water repellency. Samples A, B and E without fluoropolymer were somewhat less effective but still good.

Oil repellency was tested by visual assessment after 30 minutes in a horizontal orientation with B indicating beading and NB indicating no beading. Samples C and D (containing fluoropolymer) displayed excellent surface hydraulic oil repellency. Samples A, B and E without fluoropolymer displayed no repellency for hydraulic oil.

The water absorption test was conducted in accordance with Rilem II.4 for 20 minutes in a vertical orientation and simulating wind-driven rain conditions. Absorption is measured in a range from 0 to 5 milliliters. Samples C and D displayed excellent water repellency (0.0 ml absorption). Samples A, B and E without fluoropolymer absorbed 0.1 milliliters which is within a good range.

The test for coverage rate measures the volume of samples A through E applied per unit area of surface of the respective substrate in square feet per gallon. A light saturating application produced coverage rates in a range from 496 sq. ft/gal for Sample E to 584 sq. ft/gal. for Sample D.

The test for active wet deposition calculates the weight of active sample applied per unit area of surface of respective substrate in grams per square foot. Silane deposition varied from 4.77 g/sq. ft. for Sample B to 7.02 g/sq.ft. for Sample E. The fluoropolymer deposition was .07 g/sq.ft. for Sample C and 0.13 g/sq.ft. for Sample D.

The test for penetration depth was by visual analysis wherein a cross-section of each Sample was made and wetted for comparison to the untreated substrate. A penetration depth of 1-2 millimeters was measured for all samples.

In conclusion, based on immersion testing, all Samples A through E displayed above average water repellent protection. At high coverage rates, the silanes of Samples A, B and E displayed 0.1 milliliter absorption based on water absorption tube tests. The addition of 1% fluoropolymer in Sample C (0.07 g/sq.ft. wet deposition) increased water repellency and oil repellency significantly.

EXAMPLE II

Substrate blocks were prepared by cutting 2 inch by 2 inch by 1 inch thick blocks from "Briar Hill" cavallo buff sandstone. The substrate blocks were oven dried to a constant weight and allowed to reabsorb atmospheric humidity for 24 hours prior to treatment.

Samples were prepared to test the depth of penetration of organofluoro compounds in accordance with the present invention in comparison to conventional prior art. The prepared samples were as follows:

Sample F: A composition including 90 percent by weight 1,3-Di-n-octyl-1,1,3,3-tetraethoxysiloxane, 1 percent by weight of active fluoro polymer and 9 percent by weight of 1,1,1 trichloroethane with the fluoro polymer and trichloroethane being from a common source sold by 3M under the product designation FC-905.

Sample G: A composition including 98.9 percent of the silane of Sample F and 1.1 percent of the active fluoro polymer of Sample F. (The composition of Sample G having been formed by mixing the silane and FC-905 together and thereafter vacuum evaporating at room temperature the trichloroethane from the composition).

Sample H: A composition including 90 percent by weight isobutylmethoxysilane, 1 percent by weight active fluoropolymer and 9 percent by weight 1,1,1-trichloroethane with the source of the latter two components being the above noted FC-905.

Sample I: A composition including 98.9 percent by weight isobutyltrimethoxysilane and 1.1 percent by weight of active fluoro polymer derived by vacuum evaporation of FC-905 after addition to the silane as noted for Sample G.

Sample J: A composition including 1 percent by weight active fluoro polymer and 99 percent by weight 1,1,1-trichloroethane derived by diluting the FC-905 product noted above with the ethane.

Each of the Samples F through J was applied dropwise to a respective substrate until an effective coverage rate of 228 square feet per gallon was achieved. Treated substrates were allowed to then cure for four days. A substrate treated with each of Samples F through J along with an untreated control substrate block were split and wetted on a split side thereof with a water carried methylene blue. The depth of water repellency was determined by measuring the distance from the treated surface upon which the water beaded rather than was absorbed.

The results of the water repellency test were as follows:

| Sample | Depth of Water Repellency in millimeters |
| --- | --- |
| F | 9–10 |
| G | 9–11 |
| H | 9–10 |
| I | 10–12 |
| J | 1–2 |

Additional treated blocks with Samples H, I and J, along with an untreated control sample, were placed untreated side down in 3 to 4 millimeters of hydraulic oil (Monsanto Skydrol B-4) and the oil was allowed to rise until the top surface of the control cube was saturated with oil. The distance of the oil from the treated surface of the substrate blocks at the time of the completion of the test was measured and is reported below as the Depth of Oil Repellency:

| Sample | Depth of Oil Repellency in millimeters |
| --- | --- |
| H | 2–3 |
| I | 3–4 |
| J | 1–2 |

EXAMPLE III

The volatile organic content (VOC) of various solvent-free silanes was determined for the following silanes in accordance with proposed ASTM standard D.01.47.03 expected to be finally implemented in January, 1991. The tests were run with triplicate averages and the results are as follows:

| Sample | VOC in grams per liter |
| --- | --- |
| K: neat isobutyltrimethoxysilane | 376 |
| L: neat octyltriethoxysilane | 305 |
| M: neat 1,3-Di-n-octyl-1,1,3,3-tetraethoxydisiloxane | 220 |

It is to be understood that while certain forms of the present invention have been illustrated and described herein, it is not to be limited to the specific forms or compositions described and shown.

What is claimed and desired to be secured by Letters Patent is as follows:

1. A method of treating a substrate so as to impart water repellency to the substrate comprising the steps of:
   (a) applying to said substrate a substantially solvent-free organoalkoxysilane liquid of the following general formula:

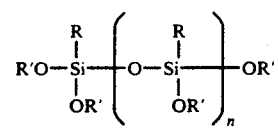

wherein:
   R is an alkyl, cycloalkyl, arylalkyl, or alkaryl group or mixtures thereof having from 1 to, about 30 carbon atoms wherein said carbon atoms are fully saturated with hydrogen or partially saturated with hydrogen with double bonds therebetween or with heteroatoms or fluorinated derivatives thereof;
   R' is an alkyl or alkoxyalkyl group having from 1 to about 8 carbon atoms or mixtures thereof; and
   n is between 1 and about 8; and
   (b) allowing said organoalkoxysilane to cure.

2. The method according to claim 1 wherein:
   (a) R is an alkyl group having between 4 and 8 carbons; and (b) n is between 1 and 3.

3. The method according to claim 1 wherein:
(a) said organoalkoxysilane is substantially: 1,3-di-n-octyl-1,1,3,3-tetraethoxydisiloxane.

4. The method according to claim 1 wherein:
(a) said organoalkoxysilane is substantially: 1,3-di-n-octyl-1,1,3,3-tetramethoxydisiloxane.

5. The method according to claim 1 including the step of:
(a) mixing an oleophobic organofluoro compound into said liquid prior to applying said liquid to said substrate.

6. The method according to claim 5 wherein:
(a) said organofluoro compound includes a volatile solvent therewith when mixed with said liquid; and including the step of:
(b) removing said volatile solvent from said liquid prior to addition of said liquid to said substrate.

7. The method according to claim 6 wherein:
(a) said organofluoro compound is a fluoropolymer.

8. The method according to claim 1 including:
(a) incorporating an organofluoro component into said organoalkoxysilane so as to render said substrate also oil repellent.

9. A method of treating a substrate to render the substrate water repellent comprising the steps of:
(a) applying to a surface of the substrate a liquid consisting essentially of an organoalkoxysilane having between 2 and 10 silicon atoms and mixtures thereof, wherein the alkoxy radical of said organoalkoxysilane has 1–8 carbon atoms.

10. The method according to claim 9 wherein:
(a) said organoalkoxysilane is a dimer, trimer or mixture thereof.

11. The method according to claim 9 including the step of:
(b) mixing an oleophobic organofluoro compound with said liquid to form a mixture prior to applying said liquid to said substrate.

12. The method according to claim 9 wherein:
(c) said organofluoro compound includes a volatile solvent therewith when mixed with said liquid; and including the step of:
(d) removing said volatile solvent from said liquid prior to application of said liquid to said substrate.

13. The method according to claim 11 wherein:
(a) said organofluoro compound is a fluoropolymer present in an amount less than about 2 percent by weight and the remainder of said mixture is said organoalkoxysilane.

14. In a solvent-free organoalkoxysilane liquid for rendering a substrate water repellent, the improvement comprising:
the addition of an oleophobic organofluoro compound in an amount between 0.1 and 2% by weight to said liquid, wherein the alkoxy radical of said organoalkoxysilane has 1–8 carbon atoms.

15. The liquid according to claim 1 wherein:
(a) said organoalkoxysilane prior to curing has substantially entirely between 2 and 10 silicon atoms and mixtures thereof.

16. A method of rendering a substrate water repellent by the application of a solvent-free organoalkoxysilane, including the step of:
(a) applying to a surface of the substrate said organoalkoxysilane substantially having only between 2 and 5 silicon atoms per molecule and condensation products and mixtures thereof;
(b) allow said organoalkoxysilane to cure.

17. A method of rendering a substrate water and oil repellent by application of a organoalkoxysilane liquid, comprising the steps of:
(a) mixing said organoalkoxysilane with an organofluoro compound and a volatile solvent for said compound to form a mixture;
(b) thereafter removing substantially all of said volatile solvent from said mixture prior to application to said substrate; and
(c) thereafter applying said mixture in a substantially solvent-free state to said substrate.

18. A method of treating a substrate to render the substrate water repellent comprising the step of:
(a) applying to a surface of the substrate a liquid consisting essentially of an organoalkoxysilane having between 2 to 10 silicon atoms and mixtures thereof;
(b) mixing an oleophobic organofluoro compound with said liquid to form a mixture prior to applying said liquid to said substrate; and
(c) said organofluoro compound includes a volatile solvent therewith when mixed with said liquid; and including the step of:
(d) removing said volatile solvent from said liquid prior to application of said liquid to said substrate.

19. A method of treating a substrate so as to impart water repellency to the substrate comprising the steps of:
(a) applying to said substrate a substantially solvent-free organoalkoxysilane liquid of the following general formula:

$$R'O-\underset{\underset{OR'}{|}}{\overset{\overset{R}{|}}{Si}}-\left(O-\underset{\underset{OR'}{|}}{\overset{\overset{R}{|}}{Si}}\right)_n-OR'$$

wherein:
R is an alkyl, cycloalkyl, arylalkyl, or alkaryl group or mixtures thereof having from 1 to about 30 carbon atoms wherein said carbon atoms are fully saturated with hydrogen or partially saturated with hydrogen with double bonds therebetween or with heteroatoms or fluorinated derivatives thereof;
R' is an alkyl or alkoxyalkyl group having from 1 to about 8 carbon atoms or mixtures thereof; and n is between 1 and about 8;
(b) allowing said organoalkoxysilane to cure;
(c) mixing an oleophobic organofluoro compound into said liquid prior to applying said liquid to said substrate; and wherein:
(d) said organofluoro compound includes a volatile solvent therewith when mixed with said liquid; and including the step of:
(e) removing said volatile solvent from said liquid prior to addition of said liquid to said substrate.

20. A substantially solvent-free liquid for the treatment of a substrate to render the substrate water repellent prior to use consisting essentially of:
(a) a liquid dimer, trimer, tetramer, or pentamer organoalkoxysilane or mixtures and condensation products thereof, wherein the alkoxy radical of said organoalkoxysilane has 1–8 carbon atoms; and
(b) an oleophobic organofluoro compound.

21. The liquid according to claim 15 wherein:

(a) said organofluoro compound is present in an amount between 0.1 and 2.0% by weight and said organoalkoxysilane is a remainder of said liquid.

22. A liquid for rendering a masonry substrate water repellent having substantially no solvent and being substantially an organoalkoxysilane having the following formula:

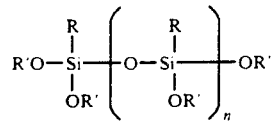

(a) wherein R and R' are alkoxy radicals having 1-8 carbon atoms and n is from 1 to 8; and
(b) an oleophobic organofluoro compound.

23. The liquid according to claim 22 wherein:
(a) said organofluoro compound is a fluoropolymer mixed with said liquid prior to usage thereof.

* * * * *